(12) United States Patent
Thielemann et al.

(10) Patent No.: US 12,392,431 B2
(45) Date of Patent: Aug. 19, 2025

(54) FLUID CONNECTOR INCLUDING A CONNECTION VERIFICATION CONTACT

(71) Applicant: Oetiker NY, Inc., Lancaster, NY (US)

(72) Inventors: Jonathan H. Thielemann, Albion, NY (US); Martin R. Price, Buffalo, NY (US)

(73) Assignee: Oetiker NY, Inc., Lancaster, NY (US)

( * ) Notice: Subject to any disclaimer, the term of this patent is extended or adjusted under 35 U.S.C. 154(b) by 0 days.

(21) Appl. No.: 18/245,622

(22) PCT Filed: Oct. 5, 2020

(86) PCT No.: PCT/US2020/054225
§ 371 (c)(1),
(2) Date: Mar. 16, 2023

(87) PCT Pub. No.: WO2022/075963
PCT Pub. Date: Apr. 14, 2022

(65) Prior Publication Data
US 2023/0358352 A1  Nov. 9, 2023

(51) Int. Cl.
*F16L 25/01* (2006.01)
*F16L 13/16* (2006.01)
*F16L 37/088* (2006.01)

(52) U.S. Cl.
CPC ............ *F16L 25/01* (2013.01); *F16L 13/163* (2013.01); *F16L 37/088* (2013.01); *F16L 2201/10* (2013.01)

(58) Field of Classification Search
CPC . F16L 37/0885; F16L 37/1225; F16L 37/144; F16L 2201/10; F16L 25/01
See application file for complete search history.

(56) References Cited

U.S. PATENT DOCUMENTS

| | | | | |
|---|---|---|---|---|
| 2,081,571 A | * | 5/1937 | Baade | F16L 37/144 285/349 |
| 4,610,465 A | * | 9/1986 | Boyadjieff | E02D 5/523 285/308 |
| 5,792,990 A | * | 8/1998 | Piero | F16L 25/01 403/220 |
| 6,027,143 A | * | 2/2000 | Berg | F16L 37/0885 285/305 |
| 7,244,142 B2 | * | 7/2007 | Kato | F16L 37/0985 340/568.4 |
| 8,360,477 B2 | * | 1/2013 | Flynn | F16L 37/088 285/302 |

(Continued)

FOREIGN PATENT DOCUMENTS

| CN | 103115208 A | * | 5/2013 | ............. F16L 19/05 |
|---|---|---|---|---|
| DE | 202004002116 | | 6/2004 | |

(Continued)

*Primary Examiner* — Zachary T Dragicevich
*Assistant Examiner* — Alexander T Rufrano
(74) *Attorney, Agent, or Firm* — Harter Secrest & Emery LLP; Michael Nicholas Vranjes (57) ABSTRACT

A cartridge for a fluid connector including a connector body having a bore, and a tube, the cartridge including a first end, a second end, a first through-bore, a first radially outward facing surface, a first radially inward facing surface, and an electrical contact at least partially embedded in the first radially inward facing surface.

20 Claims, 7 Drawing Sheets

(56) References Cited

U.S. PATENT DOCUMENTS

| | | | |
|---|---|---|---|
| 8,373,961 B2* | 2/2013 | Kuck | F16L 37/0985 361/181 |
| 11,131,411 B2* | 9/2021 | Gaurat | F16L 37/0841 |
| 11,384,880 B2* | 7/2022 | Hunt | F16L 37/144 |
| 11,774,024 B2* | 10/2023 | Barthel | F16L 37/0885 285/93 |
| 2002/0106923 A1* | 8/2002 | Copeland | H01R 4/60 439/192 |
| 2005/0063125 A1 | 3/2005 | Kato | |
| 2008/0315576 A1 | 12/2008 | Moretti et al. | |
| 2011/0018254 A1 | 1/2011 | Kuck et al. | |
| 2012/0169044 A1 | 7/2012 | Kendrick | |
| 2018/0135786 A1 | 5/2018 | Bourbon et al. | |
| 2019/0049049 A1 | 2/2019 | Ignaczak et al. | |
| 2019/0301648 A1 | 10/2019 | Leckner | |

FOREIGN PATENT DOCUMENTS

| | | |
|---|---|---|
| DE | 102005029061 | 1/2007 |
| EP | 2366933 | 9/2011 |
| FR | 3072755 | 4/2019 |
| GB | 824833 | 12/1959 |
| WO | 2005078330 | 8/2005 |
| WO | 2007003770 | 1/2007 |

\* cited by examiner

FLUID CONNECTOR INCLUDING A CONNECTION VERIFICATION CONTACT

CROSS-REFERENCE TO RELATED APPLICATIONS

The present application is the U.S. National Stage Application pursuant to 35 U.S.C. § 371 of International Patent Application No. PCT/US2020/054225, filed on Oct. 5, 2020, which application is hereby incorporated by reference in its entirety.

FIELD

The present disclosure relates to fluid connectors, and, more particularly, to a fluid connector including an electrical contact that creates an electrical circuit between components therein when the fluid connector is in a fully engaged/connected state.

BACKGROUND

Fluid connectors are integral components for many applications, and especially for automotive applications. Since an automotive system is made up of various components such as a radiator, transmission, and engine, fluid must be able to travel not only within each component but also between components. An example of fluid traveling between components is the transmission fluid traveling from the transmission to the transmission oil cooler in order to lower the temperature of the transmission fluid. Fluid predominantly moves between components via flexible or rigid hoses which connect to each component by fluid connectors. Such fluid connectors typically include a retaining clip, retaining ring clip, or snap ring carried on the connector body which is adapted to snap behind a raised shoulder of a tube when the tube is fully inserted into the connector body.

However, during the assembly process, the raised shoulder might snap behind one of the protrusions of retaining clip and give the appearance of a full connection, when in reality there is only a partial connection. Additionally, the tube can get stuck in the in the connector body without every engaging the retaining clip, which again provides the illusion of an adequate connections. In these scenarios of poor connection, a tube blow off situation can occur resulting in leaks or other quality issues.

Thus, there has been a long-felt need for a fluid connector including a connection verification contact that positively indicates a correct or an incorrect installation of the tube in the connector body.

SUMMARY

According to aspects illustrated herein, there is provided a cartridge for a fluid connector including a connector body having a bore, and a tube, the cartridge comprising a first end, a second end, a first through-bore, a first radially outward facing surface, a first radially inward facing surface, and an electrical contact at least partially embedded in the first radially inward facing surface.

In some embodiments, the electrical contact comprises a first section extending into the first through-bore, and a second section operatively arranged to engage the connector body. In some embodiments, the second section is arranged at the first end. In some embodiments, the second section is arranged in a groove in the first end. In some embodiments, the first section is arranged in an aperture, the aperture extending axially from the first end to the first radially inward facing surface. In some embodiments, the first section is operatively arranged to engage the tube. In some embodiments, the electrical contact comprises a first contact element hingedly connected to the first radially inward facing surface, and a second contact element engaged with the first contact element and operatively arranged to engage the connector body. In some embodiments, the cartridge further comprises a second through bore and the second contact element is slidably arranged in the second through-bore. In some embodiments, the second contact element is at least partially arranged in a groove in the first radially outward facing surface.

According to aspects illustrated herein, there is provided a fluid connector, comprising a connector body, including a first through-bore, a first radially inward facing surface, and an axial surface, a non-conductive cartridge removably arranged in the first through-bore, including a first end, a second end, a second through-bore, a first radially outward facing surface, a second radially inward facing surface, and an electrical contact at least partially embedded in the first radially inward facing surface, and a retaining clip operatively arranged in the cartridge proximate the second end, the retaining clip including at least one protrusion extending radially inward into the second through-bore.

In some embodiments, the electrical contact comprises a first section extending into the second through-bore, and a second section operatively arranged to engage the connector body. In some embodiments, the second section is arranged at the first end. In some embodiments, the second section is arranged in a groove in the first end. In some embodiments, the first section is arranged in an aperture, the aperture extending axially from the first end to the second radially inward facing surface. In some embodiments, the electrical contact comprises a first contact element hingedly connected to the first radially inward facing surface, and a second contact element engaged with the first contact element and operatively arranged to engage the connector body. In some embodiments, the cartridge further comprises a third through-bore and the second contact element is slidably arranged in the third through-bore. In some embodiments, the second contact element comprises a first section engaged with the first contact element, and a second section arranged in a groove in the first radially outward facing surface. In some embodiments, in a partially engaged state, the second section is spaced apart from the first radially inward facing surface, and in a fully engaged state, the second section abuts against the first radially inward facing surface. In some embodiments, in a partially engaged state, the second contact element is arranged radially inward from the first radially outward facing surface, and in a fully engaged state, the second contact element is aligned with or arranged radially outward from the first radially outward facing surface.

According to aspects illustrated herein, there is provided a fluid connector, comprising a connector body, including a first through-bore, a first radially inward facing surface, and an axial surface, a cartridge secured in the first through-bore, including a first end, a second end, a second through-bore, a first radially outward facing surface, a second radially inward facing surface, and an electrical contact extending from the second radially inward facing surface to at least one of the first end and the first radially outward facing surface, a retaining clip operatively arranged in the cartridge proximate the second end, the retaining clip including at least one protrusion extending radially inward into the second through-bore, and a tube operatively arranged to be secured in the connector body via the cartridge, wherein in a partially engaged state, the tube is not electrically connected to the connector body, and in a fully engaged state, the tube is electrically connected to the connector body via the electrical contact.

According to aspects illustrated herein, there is provided a fluid connector that provides positive identification that a full connection has been made of the tube to the connector body during the production assembly process. The change in continuity of the connector body and the tube assembly provides verification that the tube has been installed completely past the retaining clip. This change in continuity can be recorded visually (e.g., indication lights), audibly (e.g., one or more sounds such as a "beep"), and/or electronically using some form of input/battery voltage and an intelligent electronic device (IED) and/or a programmable logic controller (PLC)/software program. The fluid connector provides the user a positive identification for correct installation of the tube into the connector body.

The fluid connector of the present disclosure prevents the user from experiencing a tube blow off situation that can result in leaks or other quality issues. The fluid connector can provide reassurance that a full connection exists. The fluid connector of the present disclosure comprises a self-contained detection device arranged within the connector body itself and does not require a separate piece to be assembled at the tube supplier. In some embodiments, the tube and the connector body comprise a conductive material.

The fluid connector of the present disclosure is a self-contained assembly solution that utilizes the contact of the tube the connector body through the conductive contact pin. The fluid connector includes isolating materials to prevent the retaining clip and tube from creating a false connection (only when the tube shoulder contacts the conductive pin is the circuit completed between the connector body and the tube). In some embodiments, the fluid connector comprises an anodized washer and a rubber gasket operatively arranged to isolate the tube from contacting the connector body. The retaining clip is isolated from the connector body by being arranged in a plastic or non-conductive cartridge. The anodized washer is arranged adjacent to the cartridge and a flange of the connector body is crimped to secure the components therein. It should be appreciated that the fluid connector of the present disclosure can be reused in an assembly plant if a fluid line must be removed (e.g., from a vehicle) and reinstalled.

In some embodiments, the fluid connector of the present disclosure comprises a plastic insert or cartridge that will house the contact pin and act as an isolator for the tube. In some embodiments, the contact pin is insert molded or pressed into the cartridge. A rubber isolator or seal is arranged in the through-bore of the connector body (e.g., an O-ring) to prevent the tube nose from contacting the connector body and a nonconductive washer or metallic washer bonded with a layer of nonconductive material (e.g., foam, cork, etc.) is arranged in the through-bore of the connector body to isolate the retaining clip and tube from the connector body to prevent a false positive connection indication. In some embodiments, the contact pin is angled and extends from the bottom or first end of the cartridge to a radially inward facing surface of the cartridge. When the tube is fully installed within the connector body (i.e., the retaining clip is snapped behind the tube shoulder), the tube will contact the pin and close the circuit between the tube and the connector body. The contact pin is now compressed and will be in constant contact with the body due to the force of the tube inserted under the retaining clip. Using a continuity tool (e.g., a voltmeter, battery powered source with a light emitting diode (LED), a PLC, a handheld device, etc.), one contact terminal of the tool is engaged with the connector body and the outer contact terminal of the tool is engaged with the tube (e.g., a radially outward facing surface thereof). The tool will indicate via a signal, vibration, sound, etc. indicating that there is continuity (i.e., that the tube is fully connected to the connector body). In some embodiments, the tool sends such verification data (i.e., voltage data) to a remote location (e.g., a computing device).

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

It should be appreciated that the term "tube" as used herein is synonymous with hose, pipe, channel, conduit, tube end form, or any other suitable pipe flow used in hydraulics and fluid mechanics. It should further be appreciated that the term "tube" can mean a rigid or flexible conduit of any material suitable for containing and allowing the flow of a gas or a liquid.

Figure 1:
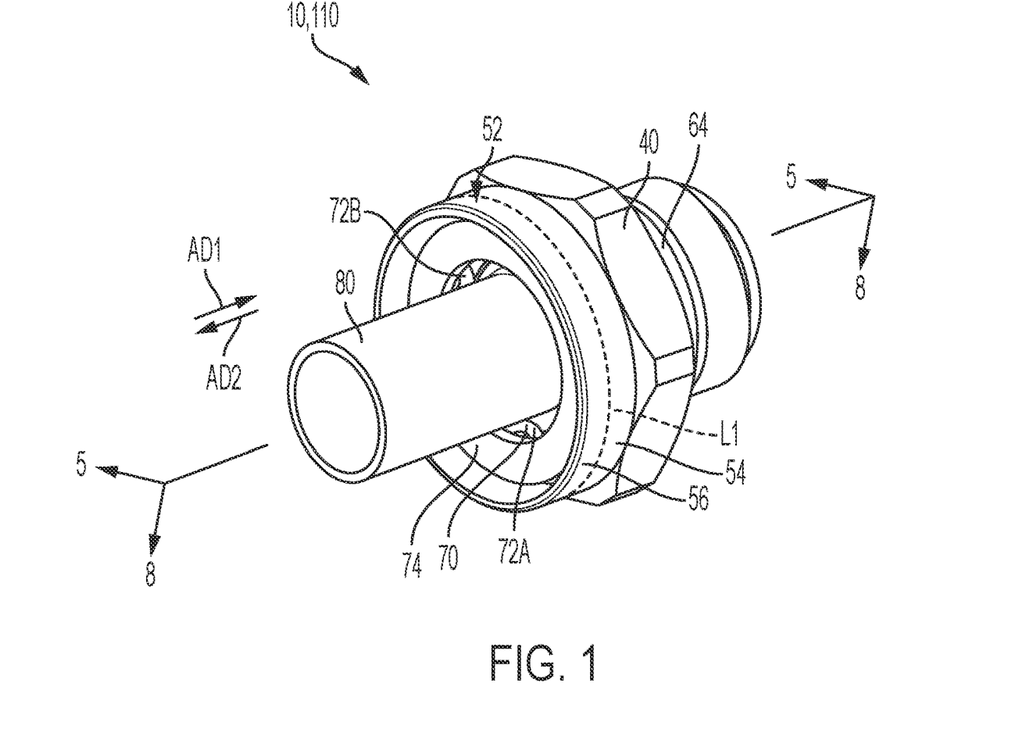
FIG. 1 is a perspective view of a fluid connector, in an unsecured state.
Figure 2:
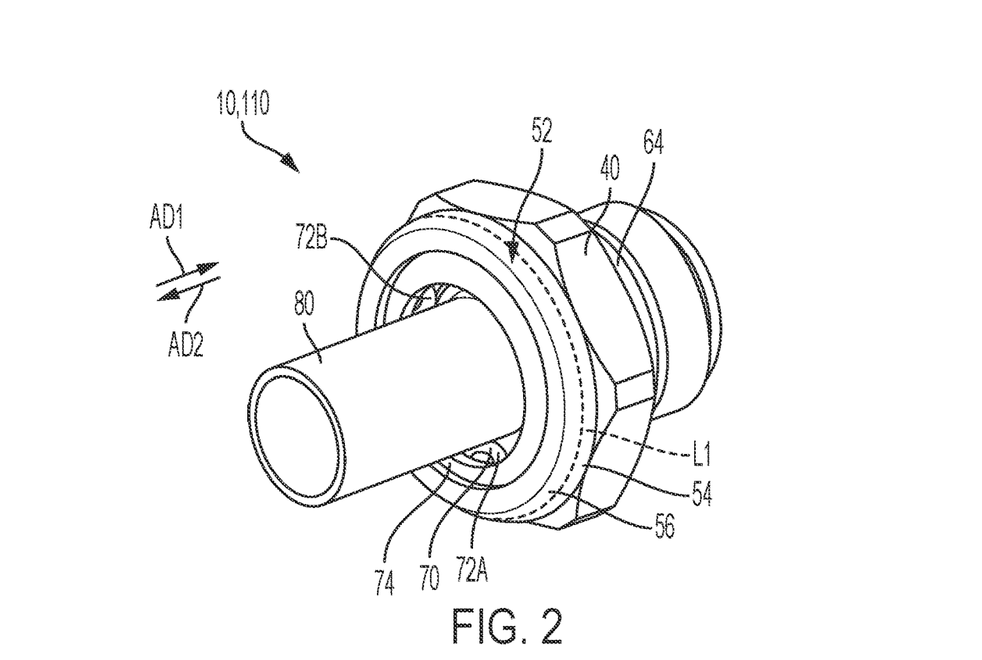
FIG. 2 is a perspective view of the fluid connector shown in FIG. 1, in a secured state.
Figure 3:
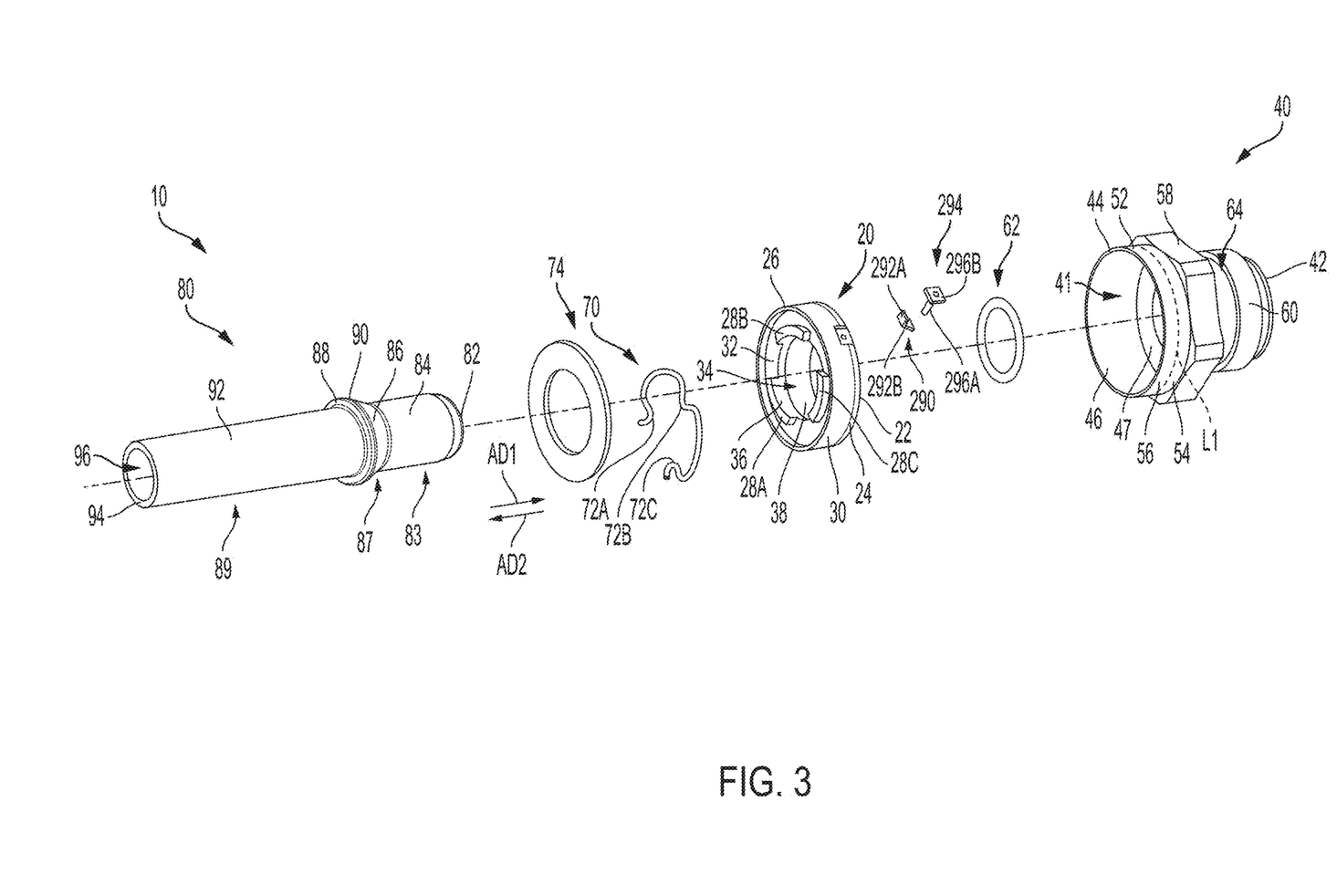
FIG. 3 is an exploded perspective view of the fluid connector shown in FIG. 1.
Figure 4A:
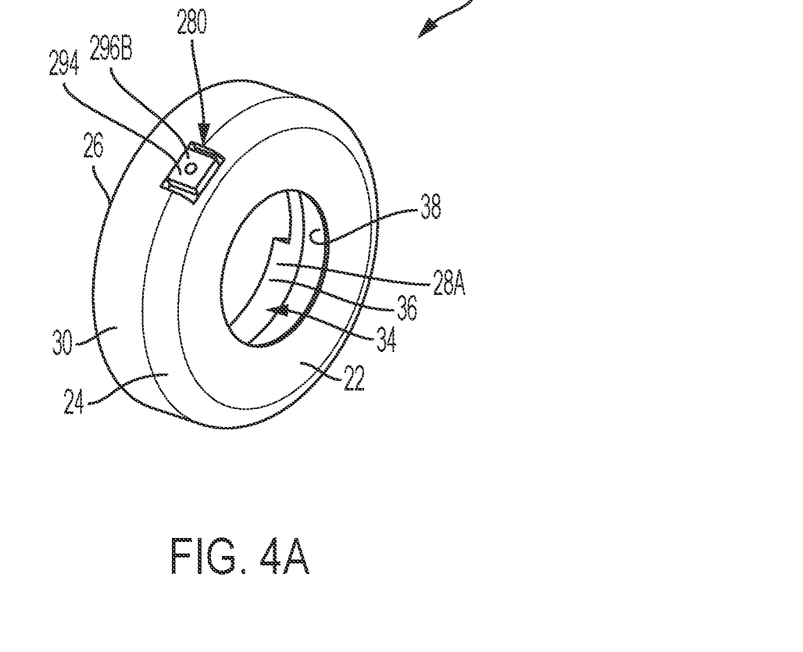
FIG. 4A is a rear perspective view of the cartridge shown in FIG. 3.
Figure 4B:
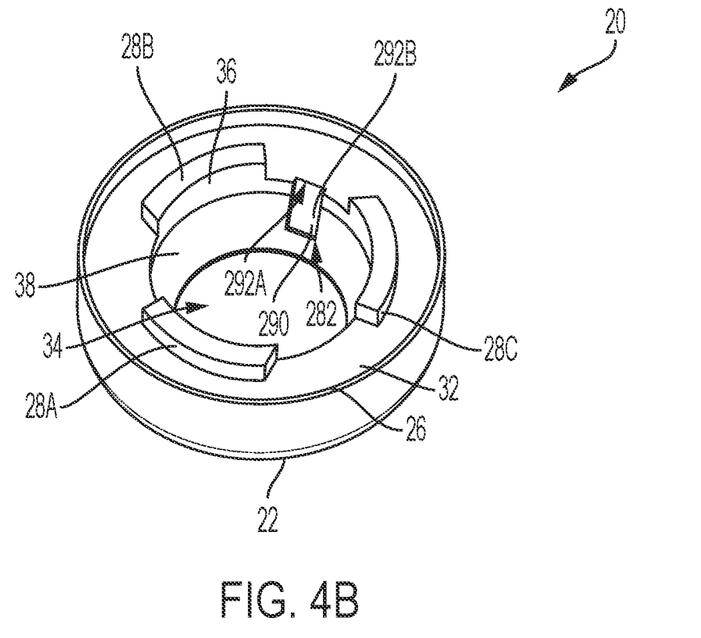
FIG. 4B is a front perspective view of the cartridge shown in FIG. 3.
Figure 5A:
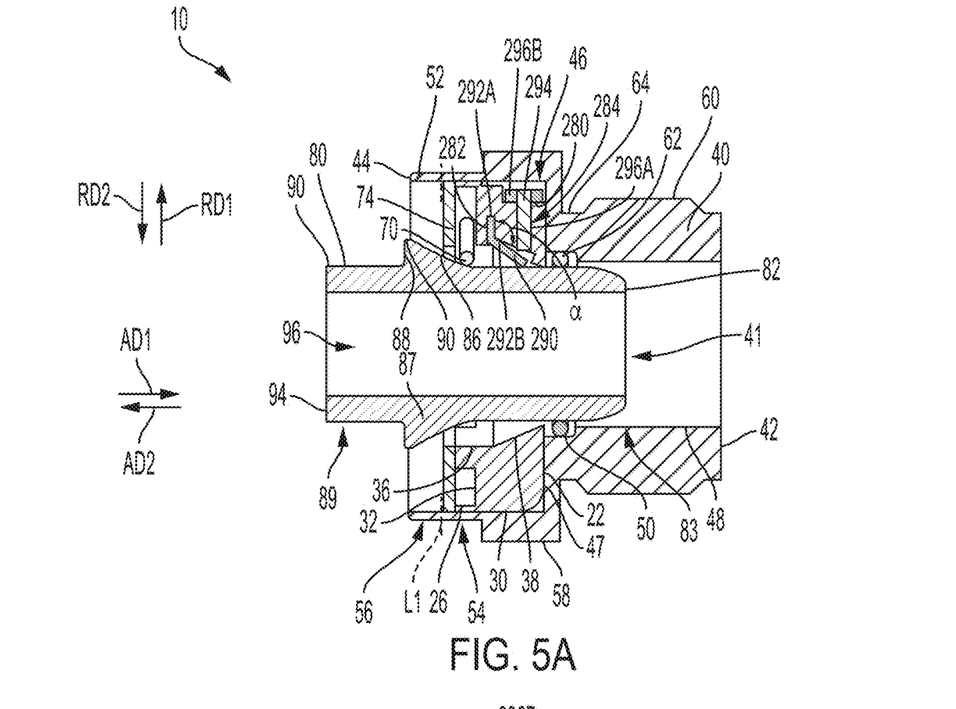
FIG. 5A is a cross-sectional view of the fluid connector taken generally along line 5-5 in FIG. 1, in a partially engaged state.
Figure 5B:
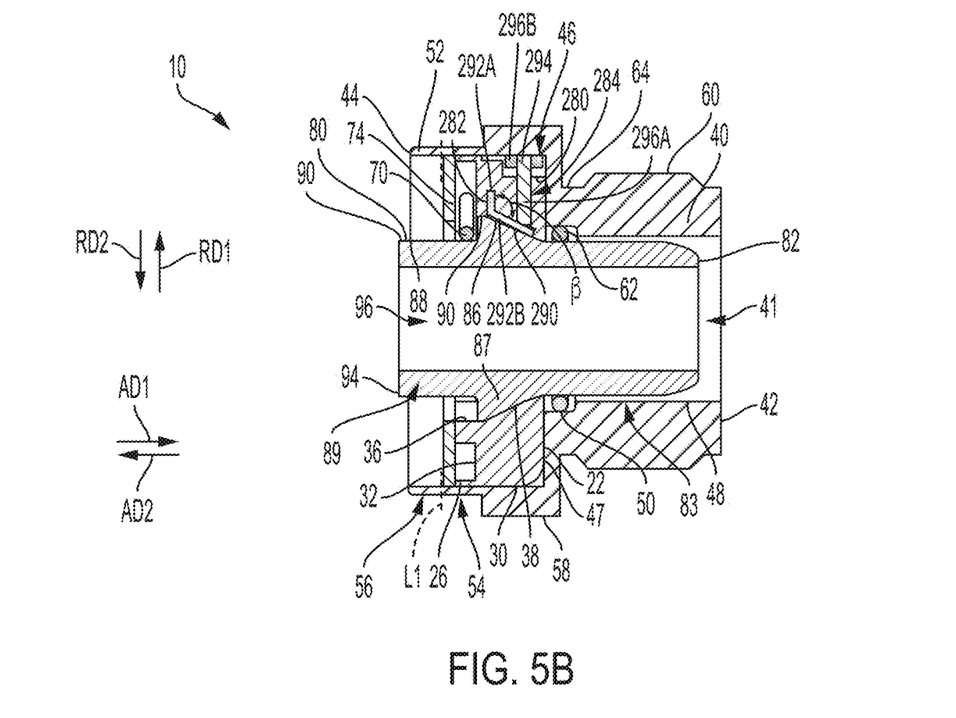
FIG. 5B is a cross-sectional view of the fluid connector taken generally along line 5-5 in FIG. 1, in a fully engaged state.

Adverting now to the figures, FIG. 1 is a perspective view of fluid connector 10 in an unsecured state. FIG. 2 is a perspective view of fluid connector 10 in a secured state. FIG. 3 is an exploded perspective view of fluid connector 10. FIG. 4A is a rear perspective view of cartridge 20. FIG. 4B is a front perspective view of cartridge 20. FIG. 5A is a cross-sectional view of fluid connector 10 taken generally along line 5-5 in FIG. 1, in a partially engaged state. FIG. 5B is a cross-sectional view of fluid connector 10 taken generally along line 5-5 in FIG. 1, in a fully engaged state. Fluid connector 10 generally comprises cartridge 20, connector body 40, and tube 80. In some embodiments, fluid connector 10 further comprises disk 74. For the purposes of the present disclosure, "unsecured state" is intended to mean that flange 52 of connector body 40 has not yet been crimped over cartridge 20 or cartridge 220 (and disk 74). "Secured state" is intended to mean that section 56 of flange 52 has been crimped over cartridge 20 or cartridge 220 (and disk 74) thereby securing cartridge 20, 220 and retaining clip 70 within connector body 40. The following description should be read in view of FIGS. 1-5B.

Connector body 40 comprises through-bore 41 extending from end 42 to end 44, radially inward facing surface 46, radially inward facing surface 48, flange 52, head 58, and radially outward facing surface 60. Connector body 40 is arranged to be connected to a component that is filled with a fluid. For example, connector body 40 may be connected to a transmission via radially outward facing surface 60, which may comprise external threading. Connector body 40 may be screwed into a threaded hole in the transmission via head 58 (e.g., using a wrench), which is then filled with transmission fluid. In some embodiments, head 58 is hexagonal; however, it should be appreciated that head 58 may comprise any geometry suitable for applying torque to connector body 40. Another component in which fluid connector 10, specifically connector body 40, may be installed into is an engine block. It should be appreciated that fluid connector 10 may be used in various other components, assemblies, and subassemblies in which fluid connection is desired. Radially outward facing surface 60 may further comprise groove 64. A seal or O-ring may be arranged in groove 64 to create a fluid tight seal between connector body 40 and the component it is connected to. Seal 62 is arranged in connector body 40. Specifically, seal 62 is arranged in groove 50. In some embodiments, seal 62 is an O-ring. Body 40 further comprises surface 47, which extends between and connects radially inward facing surface 46 and radially inward facing surface 48. Surface 47 is operatively arranged to engage cartridge 20, as will be described in greater detail below. Flange 52 extends from head 58 in axial direction AD2. Flange 52 comprises section 54 and section 56, which are shown in the figures as being separated by fold line L1. It should be appreciated that fold line L1 is an imaginary line used solely for the purposes of describing the folding action of flange 52 herein. In some embodiments, connector body 40 comprises a metal. In some embodiments, connector body 40 comprises a conductive material with flange 52 comprising a suitable malleable material.

Tube 80 comprises end 82, section 83, shoulder 87, section 89, end 94, and through-bore 96. Through-bore 96 extends through tube 80 from end 82 to end 94. Section 83 is arranged between end 82 and shoulder 87 and comprises radially outward facing surface 84. Radially outward facing surface 84 includes a substantially constant diameter. In some embodiments, radially outward facing surface 84 comprises a frusto-conical taper proximate end 82 (see FIGS. 5A-B). Shoulder 87 is arranged between section 83 and section 89 and comprises radially outward facing surface 86, radially outward facing surface 90, and surface 88. As shown, radially outward facing surface 86 is a frusto-conical surface extending from radially outward surface 84 to radially outward facing surface 90. Radially outward facing surface 86 increases in diameter is axial direction AD2. In some embodiments, radially outward facing surface 86 is an axial surface facing at least partially in axial direction AD1. Radially outward facing surface 90 extends from radially outward facing surface 86 to shoulder surface 88. In some embodiments, radially outward facing surface 90 comprises a constant diameter. In some embodiments, radially outward facing surface 90 comprises a variable diameter. Shoulder surface 88 is an axial surface facing at least partially in axial direction AD2. Section 89 is arranged between shoulder 87 and end 94 and comprises radially outward facing surface 92. Radially outward facing surface 92 includes a substantially constant diameter. Tube 80 is arranged to be inserted, specifically with end 82 first, into connector body 40 and cartridge 20. Tube 80 is inserted into connector body 40 and cartridge 20 until retaining clip 70 snaps over shoulder 87. It is the engagement of protrusions 72A-B with shoulder surface 88 that secures tube 80 within connector body 40. It should be appreciated that tube 80 may be any traditional tube comprising a bead, radially outward extending protrusion or flange, or ramp profile, which extends radially outward and axially on the outer surface of the tube, to displace a retaining ring, snap ring, or wire clip within the connector body (and cartridge) to secure the tube within the connector body. In some embodiments, tube 80 comprises a metal. In some embodiments, tube 80 comprises a conductive material.

Cartridge 20 is operatively arranged to carry and enclose retaining clip 70 as well as contact elements 290 and 294. Cartridge 20 comprises end 22, radially outward facing surface 24, radially outward facing surface 30, end 32, and through-bore 34. Radially outward facing surface 24 is generally curvilinear and connects end 22 with radially outward facing surface 30. Cartridge 20 further comprises radially inward facing surface 36 proximate end 32 and radially inward facing surface 38 proximal end 22. In some embodiments, radially inward facing surface 36 comprises a constant diameter. In some embodiments, radially inward facing surface 36 comprises a variable diameter. In some embodiments, radially inward facing surface 38 comprises a variable diameter (e.g., is frusto-conical). In some embodiments, radially inward facing surface 38 comprises a constant diameter with a flange arranged to engage shoulder 87. End 32 comprises one or more projections (e.g., projections 28A-C) and lip 26. Projections 28A-C extend from end 32 in axial direction AD2 and are generally aligned with radially inward facing surface 36 (i.e., the radially inward facing surface of projections 28A-C are aligned with radially inward facing surface 36). Lip 26 extends from end 32 in axial direction AD2 and is generally aligned with radially outward facing surface 30 (i.e., the radially outward facing surface of lip 26 is aligned with radially outward facing surface 30). Cartridge 20 is operatively arranged to be inserted, with end 22 first, into through-bore 41 at end 44 of connector body 40 and secured therein. In some embodiments, cartridge 20 comprises a non-conductive material (e.g., polymer, ceramic, etc.).

Retaining clip (or retaining ring or snap clip/ring) 70 is arranged in cartridge 20, specifically, adjacent end 32 and generally concentrically arranged within lip 26 of cartridge 20 (see FIG. 5A). Retaining clip 70 is generally a retaining ring including one or more protrusions extending radially inward. In the embodiment shown, retaining clip 70 comprises protrusions 72A-C. Protrusions 72A-C extend radially inward through projections 28A-C and into through-bore 34. Protrusions 72A-C are arranged to engage shoulder 87, specifically, shoulder surface 88, to secure tube 80 within cartridge 20 and thus connector body 40. Retaining clip 70 may comprise any material that is capable of elastically deforming and returning to its original shape (e.g., metal, polymer, etc.).

To assemble fluid connector 10, cartridge 20 is inserted into connector body 40. As shown in FIGS. 5A-B, end 22 of cartridge 20 engages surface 47 of connector body 40. End 22 thereby forms the second half of the seal or O-ring gland by enclosing seal 62 within groove 50. Radially outward facing surface 24 and radially outward facing surface 30 are arranged proximate to or engage with radially inward facing surface 46. Retaining clip 70 is then arranged on cartridge 20. Specifically, and as previously described, retaining clip 70 is arranged within lip 26 on projections 28A-C such that protrusions 72A-C extend into through-bore 34 of cartridge 20. Disk 74 is then inserted into through-bore 41 of connector body. As shown in the figures, disk 74 is generally a washer-shaped element that is arranged proximate to or abuts against projections 28A-C, which encloses retaining clip 70 (i.e., retaining clip 70 is prevented from displacement in axial direction AD1 by end 32 and in axial direction AD2 by disk 74). In some embodiments, disk 74 comprises a nonconductive material. In some embodiments, disk 74 comprises an anodized metal. In some embodiments, disk 74 comprises a metal bonded with a layer of nonconductive foam or cork. It should be appreciated that disk 74 is designed to be nonconductive so as to insulate tube 80 from initiating electrical contact with connector body 40 until the fully engaged state is achieved. Flange 52 is then crimped radially inward, around disk 74, to secure cartridge 20 within connector body 40, as shown in FIG. 2. Specifically, section 56 is crimped or bent radially inward about bend line L1, until section 56 is arranged proximate to or abuts against disk 74. It should be appreciated that in some embodiments, when disk 74 is not present, section 56 is crimped radially inward proximate bend line L1 until section 56 is arranged proximate to or abuts against projections 28A-C of cartridge 20. In the secured state, cartridge 20 is prevented from displacement in axial direction AD1 by surface 47 and axial direction AD2 by crimped section 56. It should be appreciated that tube 80 is not inserted into cartridge 20 and connector body 40 until flange 52 has been crimped. FIGS. 5A-B shows tube 80 inserted into cartridge 20 and connector body 40 in an unconnected state only to further illustrate the interaction and orientation of the components. However, tube 80 would not be present during the assembly of cartridge 20 and connector body 40.

Cartridge 20 further comprises groove 280 arranged in radially outward facing surface 30 (and radially outward facing surface 24), groove 282 arranged in radially inward facing surface 38 (and radially inward facing surface 36), and through-bore 284 which extends from radially inward facing surface 38, specifically, groove 282, in radial direction RD1 to radially outward facing surface 46, specifically, groove 280 (see FIGS. 4A-5B).

Fluid connector 10 further comprises an electrically conductive contact (e.g., contact elements 290 and 294). Contact element 290 is operatively arranged to engage with groove 282 and comprises section 292A and section 292B. As best shown in FIGS. 5A-B, section 292A extends into a first section of groove 282 that extends in radial direction RD1 from radially inward facing surface 36. Section 292A is secured within the first section of groove 282 via any suitable means, for example, interference fit, adhesives, bolts, rivets, etc. Section 292B is engaged with a second section of groove 282 in radially inward facing surface 38. Section 292B is operatively arranged to be displaceable relative to section 292A. In the partially engaged state shown in FIG. 5A, section 292B is arranged at angle α relative to section 292A. However, in the fully engaged state shown in FIG. 5B, when shoulder 87 is engaged with section 292B, section 292 is arranged at angle β relative to section 292A, wherein angle γ is less than angle α. In some embodiments, contact element 290 comprises a metal.

Contact element 294 is operatively arranged to engage with groove 280 and through-bore 284 and comprises first section 296A and second section 296B. As best shown in FIGS. 5A-B, section 296A extends through through-bore 284 and engages section 292B on a first end thereof. On its second end, section 296B engages groove 280 and is connected to section 296B. Section 296B is operatively arranged to engage groove 280. In the partially engaged state shown in FIG. 5A, section 296B is arranged in groove 280 radially inward of radially outward facing surface 30 (i.e., a radial gap exists between section 296B and radially inward facing surface 46). In the fully engaged state shown in FIG. 5B, shoulder 87 engages section 292B which thereby forces section 296A and section 296B radially outward in radial direction RD2 and into contact with radially inward facing surface 46 (i.e., there no longer exists a radial gap between section 296B and radially inward facing surface 46). It is this connection, between tube 80, contact element 290, contact element 294, and connector body 40 that creates the electrical continuity that verifies the connection. In other words, in the fully engaged state shown in FIG. 5B, an electrical circuit is created between tube 80, contact element 290, contact element 294, and connector body 40. In the partially engaged state shown in FIG. 5A, there is no electrical circuit created between tube 80, contact element 290, contact element 294, and connector body 40 because tube 80 is not engaged with contact element 290.

Figure 6:
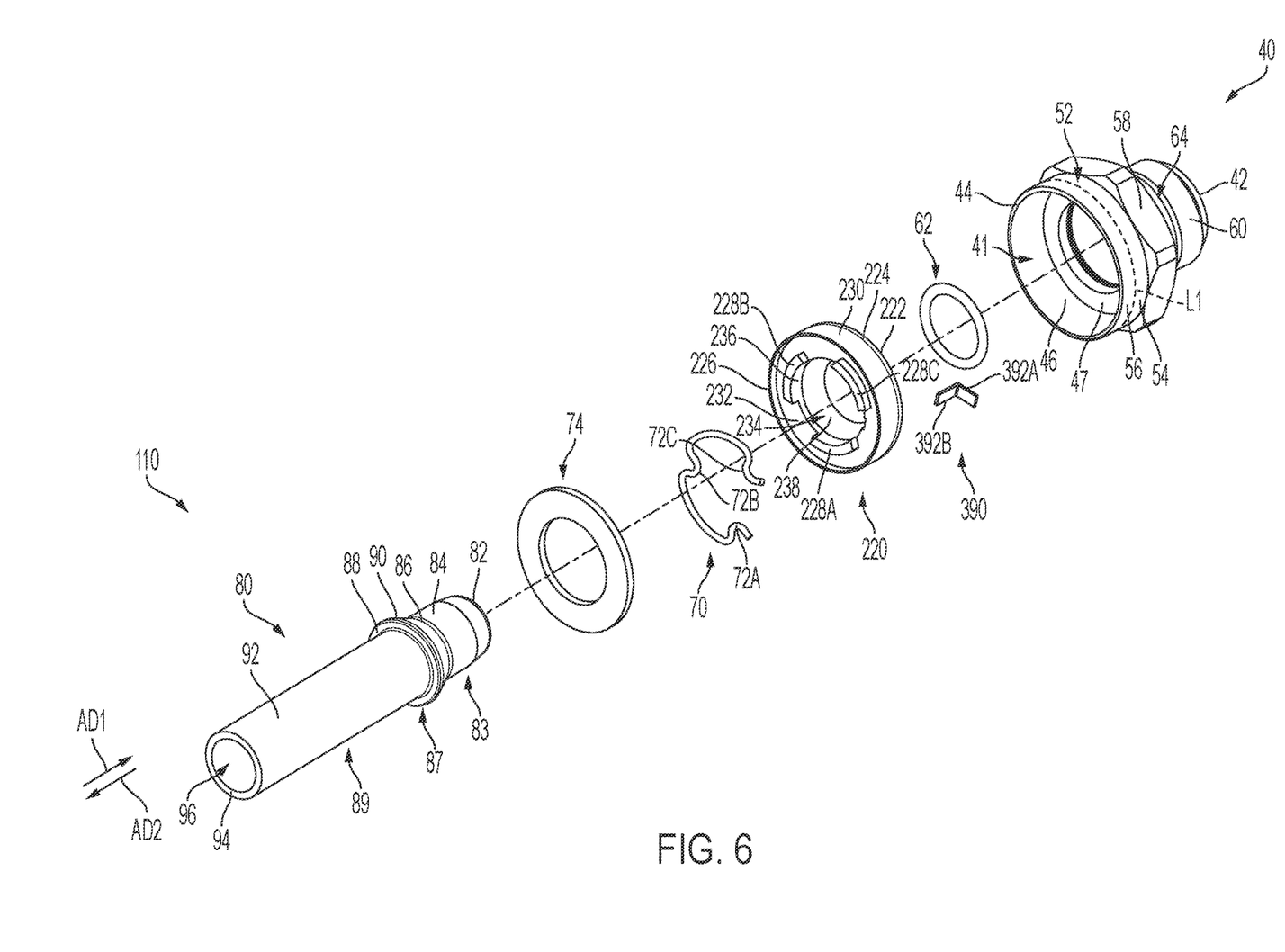
FIG. 6 is an exploded perspective view of the fluid connector shown in FIG. 1.
Figure 7A:
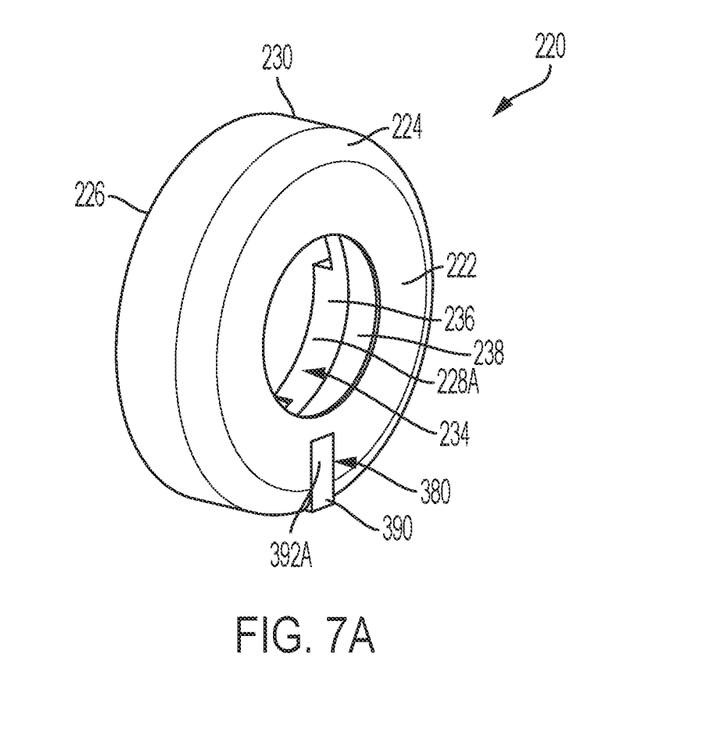
FIG. 7A is a rear perspective view of the cartridge shown in FIG. 6.
Figure 7B:
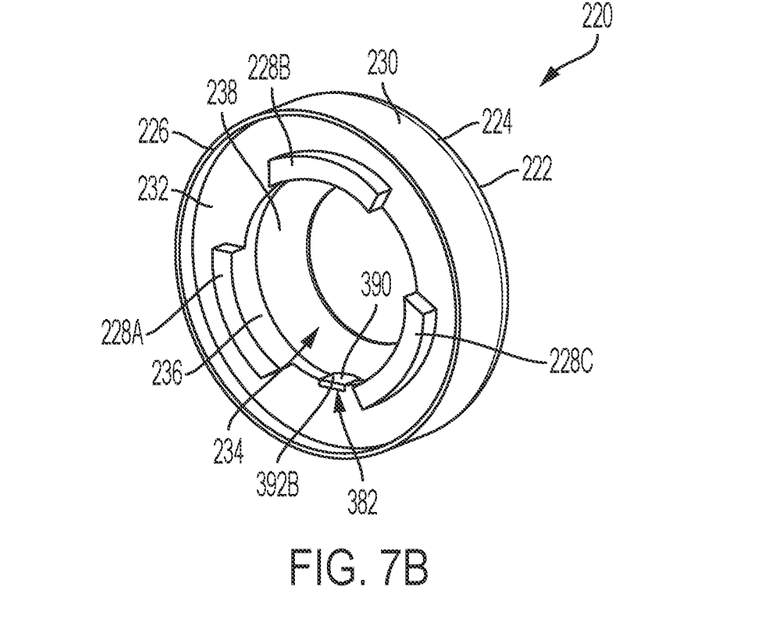
FIG. 7B is a front perspective view of the cartridge shown in FIG. 6.
Figure 8A:
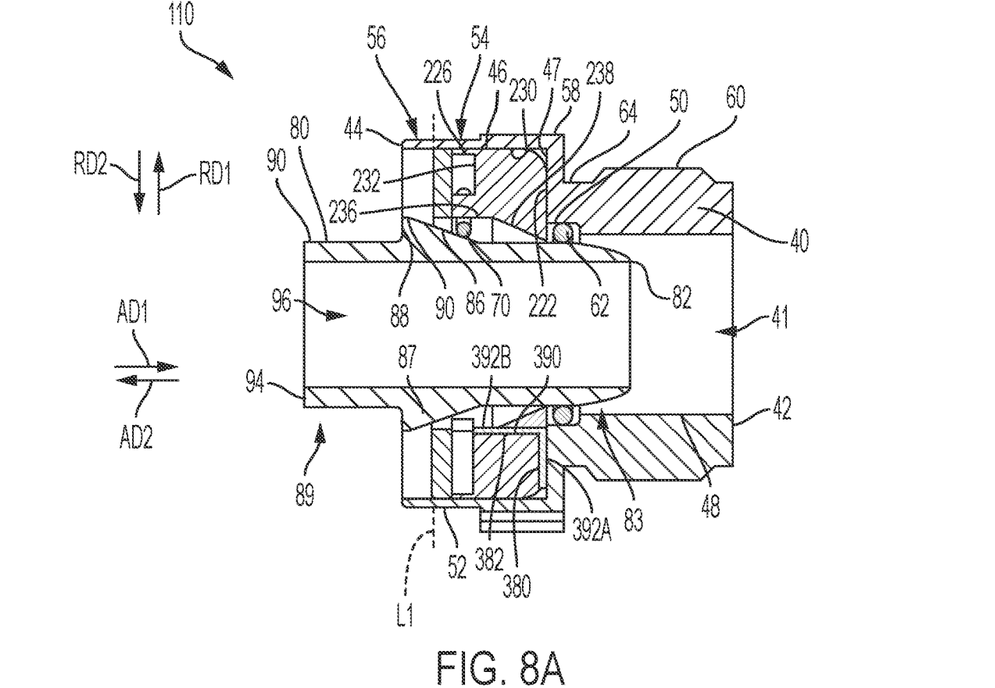
FIG. 8A is a cross-sectional view of the fluid connector taken generally along line 8-8 in FIG. 1, in a partially engaged state; and, FIG. 8B is a cross-sectional view of the fluid connector taken generally along line 8-8 in FIG. 1, in a fully engaged state.
Figure 8B:
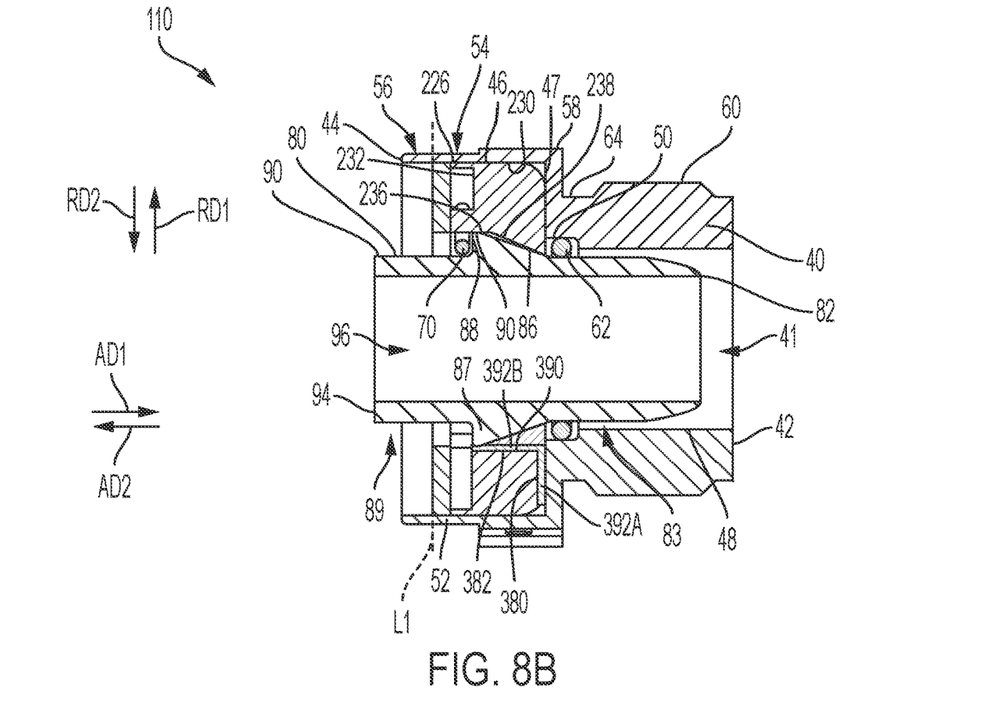

FIG. 1 is a perspective view of fluid connector 110 in an unsecured state. FIG. 2 is a perspective view of fluid connector 110 in a secured state. FIG. 6 is an exploded perspective view of fluid connector 110. FIG. 7A is a rear perspective view of cartridge 220. FIG. 7B is a front perspective view of cartridge 220. FIG. 8A is a cross-sectional view of fluid connector 110, taken generally along line 8-8 in FIG. 1, in a partially engaged state. FIG. 8B is a cross-sectional view of fluid connector 110 taken generally along line 8-8 in FIG. 1, in a fully engaged state. Fluid connector 110 generally comprises cartridge 220, connector body 40, and tube 80. In some embodiments, fluid connector 110 further comprises disk 74. The following description should be read in view of FIGS. 1-2 and 6-8B.

Cartridge 220 is operatively arranged to carry and enclose retaining clip 70 as well as contact 390. Cartridge 220 comprises end 222, radially outward facing surface 224, radially outward facing surface 230, end 232, and through-bore 234. Radially outward facing surface 224 is generally curvilinear and connects end 222 with radially outward facing surface 230. Cartridge 220 further comprises radially inward facing surface 236 proximate end 232 and radially inward facing surface 238 proximal end 222. In some embodiments, radially inward facing surface 236 comprises a constant diameter. In some embodiments, radially inward facing surface 236 comprises a variable diameter. In some embodiments, radially inward facing surface 238 comprises a variable diameter (e.g., is frusto-conical). In some embodiments, radially inward facing surface 238 comprises a constant diameter with a flange arranged to engage shoulder 87. End 232 comprises one or more projections (e.g., projections 228A-C) and lip 226. Projections 228A-C extend from end 232 in axial direction AD2 and are generally aligned with radially inward facing surface 236 (i.e., the radially inward facing surface of projections 228A-C are aligned with radially inward facing surface 236). Lip 266 extends from end 232 in axial direction AD2 and is generally aligned with radially outward facing surface 230 (i.e., the radially outward facing surface of lip 226 is aligned with radially outward facing surface 230). Cartridge 220 is operatively arranged to be inserted, with end 222 first, into through-bore 41 at end 44 of connector body 40 and secured therein. In some embodiments, cartridge 220 comprises a non-conductive material (e.g., polymer, ceramic, etc.).

Retaining clip (or retaining ring or snap clip/ring) 70 is arranged in cartridge 220, specifically, adjacent end 232 and generally concentrically arranged within lip 226 of cartridge 220 (see FIG. 8A). Retaining clip 70 is generally a retaining ring including one or more protrusions extending radially inward. In the embodiment shown, retaining clip 70 comprises protrusions 72A-C. Protrusions 72A-C extend radially inward through projections 228A-C and into through-bore 234. Protrusions 72A-C are arranged to engage shoulder 87, specifically, shoulder surface 88, to secure tube 80 within cartridge 220 and thus connector body 40. Retaining clip 70 may comprise any material that is capable of elastically deforming and returning to its original shape (e.g., metal, polymer, etc.).

To assemble fluid connector 210, cartridge 220 is inserted into connector body 40. As shown in FIGS. 8A-B, end 222 of cartridge 220 engages surface 47 of connector body 40. End 222 thereby forms the second half of the seal or O-ring gland by enclosing seal 62 within groove 50. Radially outward facing surface 224 and radially outward facing surface 230 are arranged proximate to or engage with radially inward facing surface 46. Retaining clip 70 is then arranged on cartridge 220. Specifically, and as previously described, retaining clip 70 is arranged within lip 226 on projections 228A-C such that protrusions 72A-C extend into through-bore 234 of cartridge 220. Disk 74 is then inserted into through-bore 41 of connector body. As shown in the figures, disk 74 is generally a washer-shaped element that is arranged proximate to or abuts against projections 228A-C, which encloses retaining clip 70 (i.e., retaining clip 70 is prevented from displacement in axial direction AD1 by end 232 and in axial direction AD2 by disk 74). Flange 52 is then crimped radially inward, around disk 74, to secure cartridge 220 within connector body 40, as shown in FIG. 2. Specifically, section 56 is crimped or bent radially inward about bend line L1, until section 56 is arranged proximate to or abuts against disk 74. It should be appreciated that in some embodiments, when disk 74 is not present, section 56 is crimped radially inward proximate bend line L until section 56 is arranged proximate to or abuts against projections 228A-C of cartridge 220. In the secured state, cartridge 220 is prevented from displacement in axial direction AD1 by surface 47 and axial direction D2 by crimped section 56. It should be appreciated that tube 80 is not inserted into cartridge 220 and connector body 40 until flange 52 has been crimped. FIGS. 8A-B shows tube 80 inserted into cartridge 220 and connector body 40 in an unconnected state only to further illustrate the interaction and orientation of the components. However, tube 80 would not be present during the assembly of cartridge 220 and connector body 40.

Cartridge 220 further comprises groove 380 arranged in end 222 (and radially outward facing surface 224), and aperture 382 which extends from radially inward facing surface 236 (and radially inward facing surface 238) in axial direction AD1 to end 222, specifically, groove 380 (see FIGS. 7A-8B). Groove 380 extends axially in axial direction AD2 into end 222. Aperture 382 is generally parallel to radially outward facing surface 230. In some embodiments, aperture 382 is nonparallel to radially outward facing surface 230.

Fluid connector 110 further comprises an electrically conductive contact (e.g., contact 390). Contact 390 is operatively arranged to engage with groove 380 and aperture 382 and comprises section 392A and section 392B. As best shown in FIGS. 8A-B, section 392A is arranged in groove 380 and is operatively arranged to contact surface 47. Section 392B extends through aperture 382 in axial direction AD2 such that a portion thereof is exposed in through-bore 41. Contact 390 is secured within groove 380 and/or aperture 382 via any suitable means, for example, interference fit, adhesives, bolts, rivets, etc. In some embodiments, contact 390 is slidingly secured within groove 380 and/or aperture 382 (i.e., contact 390 is "loose" within cartridge 220). Section 392B is arranged at an angle relative to section 392A (e.g., 90 degrees). In the partially engaged state shown in FIG. 8A, section 392A is engaged with surface 47, but shoulder 87 is not engaged with the exposed portion of section 392B. In the fully engaged state shown in FIG. 8B, section 392A is engaged with surface 47 and shoulder 87 is engaged with section 392B. It is this connection, between tube 80, contact element 390, and connector body 40 that creates the electrical continuity that verifies the connection. In other words, in the fully engaged state shown in FIG. 8B, an electrical circuit is created between tube 80, contact element 390, and connector body 40. In the partially engaged state shown in FIG. 8A, there is no electrical circuit created between tube 80, contact element 390, and connector body 40 because tube 80 is not engaged with contact element 390.

The electrical circuit that is created (or not created) is intended to be read or indicated by another device. For example, in some embodiments, a first contact of a voltmeter is placed in contact with tube 80 and a second contact of a voltmeter is placed in contact with connector body 40. Once tube 80 is fully engaged with connector body 40, the voltmeter will indicate an electrically connected circuit since tube 80, the electrical contact (e.g., contact elements 290 and 294, or contact 390), and connector body all comprise an electrically conductive material (e.g., a metal) and are all in contact.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMERALS

10 Fluid connector
20 Cartridge
22 End
24 Radially outward facing surface
26 Lip
28A Projection
28B Projection
28C Projection
30 Radially outward facing surface
32 End
34 Through-bore
36 Radially inward facing surface
38 Radially inward facing surface
40 Connector body
41 Through-bore
42 End
44 End
46 Radially inward facing surface
47 Surface
48 Radially inward facing surface
50 Groove
52 Flange
54 Section
56 Section
58 Head
60 Radially outward facing surface
62 Seal
64 Groove
70 Retaining clip
72A Protrusion
72B Protrusion
72C Protrusion
74 Disk
80 Tube
82 End
83 Section
84 Radially outward facing surface
86 Radially outward facing surface
87 Shoulder
88 Surface
89 Section
90 Radially outward facing surface
92 Radially outward facing surface
94 End
96 Through-bore
110 Fluid connector
220 Cartridge
222 End
224 Radially outward facing surface
226 Lip
228A Projection
228B Projection
228C Projection
230 Radially outward facing surface
232 End
234 Through-bore
236 Radially inward facing surface
238 Radially inward facing surface
280 Groove
282 Aperture
284 Through-bore
290 Contact element
292A Section
292B Section
294 Contact element 296A Section
296B Section
380 Groove
382 Aperture
390 Contact
392A Section
392B Section
L1 Line
AD1 Axial direction
AD2 Axial direction
RD1 Radial direction
RD2 Radial direction
α Angle
β Angle

What is claimed is:

1. A fluid connector, comprising:
a connector body, including a first through-bore, a first radially inward facing surface;
a non-conductive cartridge removably arranged and secured in the first through-bore, including:
a first end;
a second end;
a second through-bore;
a first radially outward facing surface; and
a second radially inward facing surface;
an electrical contact at least partially embedded in the second radially inward facing surface, the electrical contact operatively arranged to engage the connector body; and
a retaining clip operatively arranged in the cartridge proximate the second end, the retaining clip including at least one protrusion extending radially inward into the second through-bore.

2. The fluid connector as recited in claim 1, wherein the electrical contact comprises:
a first section extending into the second through-bore; and
a second section operatively arranged to engage the connector body.

3. The fluid connector as recited in claim 2, wherein the second section is arranged at the first end.

4. The fluid connector as recited in claim 2, wherein the second section is arranged in a groove in the first end.

5. The fluid connector as recited in claim 4, wherein the first section is arranged in an aperture, the aperture extending axially from the first end to the second radially inward facing surface.

6. The fluid connector as recited in claim 1, wherein the electrical contact comprises:
a first contact element hingedly connected to the second radially inward facing surface; and
a second contact element operatively arranged to engage the first contact element, the second contact element engaged with the connector body.

7. The fluid connector as recited in claim 6, wherein the cartridge further comprises a third through-bore and the second contact element is slidably arranged in the third through-bore.

8. The fluid connector as recited in claim 6, wherein the second contact element comprises:
a first section engageable with the first contact element; and
a second section arranged in a groove in the first radially outward facing surface.

9. The fluid connector as recited in claim 8, wherein:
in a partially engaged state, the second section is spaced apart from the first radially inward facing surface; and
in a fully engaged state, the second section abuts against the first radially inward facing surface.

10. The fluid connector as recited in claim 6, wherein:
in a partially engaged state, the second contact element is arranged radially inward from the first radially outward facing surface; and
in a fully engaged state, the second contact element is aligned with or arranged radially outward from the first radially outward facing surface.

11. A fluid connector, comprising:
a connector body, including a first through-bore, a first radially inward facing surface, and an axial surface;
a cartridge secured in the first through-bore, including:
a first end;
a second end;
a second through-bore;
a first radially outward facing surface;
a second radially inward facing surface; and
an electrical contact extending from the second radially inward facing surface to at least one of the first end and the first radially outward facing surface;
a retaining clip operatively arranged in the cartridge proximate the second end, the retaining clip including at least one protrusion extending radially inward into the second through-bore; and
a tube operatively arranged to be secured in the connector body via the cartridge;
wherein:
in a partially engaged state, the tube is not electrically connected to the connector body; and
in a fully engaged state, the tube is electrically connected to the connector body via the electrical contact.

12. A fluid connector, comprising:
a connector body, including:
a first end;
a second end;
a first through-bore;
a first radially inward facing surface; and
an axial surface;
a non-conductive cartridge removably arranged in the first through-bore axially between the first end and the second end, including:
a third end;
a fourth end;
a second through-bore;
a first radially outward facing surface; and
a second radially inward facing surface;
an electrical contact at least partially embedded in the second radially inward facing surface; and
a retaining clip operatively arranged in the cartridge proximate the fourth end, the retaining clip including at least one protrusion extending radially inward into the second through-bore.

13. The fluid connector as recited in claim 12, wherein the electrical contact comprises:
a first section extending into the second through-bore; and
a second section operatively arranged to engage the connector body.

14. The fluid connector as recited in claim 13, wherein the second section is arranged at the third end.

15. The fluid connector as recited in claim 13, wherein the second section is arranged in a groove in the third end.

16. The fluid connector as recited in claim 12, wherein the electrical contact comprises:
a first contact element hingedly connected to the second radially inward facing surface; and a second contact element operatively arranged to engage the first contact element, the second contact element engaged with the connector body.

17. The fluid connector as recited in claim 16, wherein the cartridge further comprises a third through-bore and the second contact element is slidably arranged in the third through-bore.

18. The fluid connector as recited in claim 16, wherein the second contact element comprises:
 a first section engageable with the first contact element; and
 a second section arranged in a groove in the second radially outward facing surface.

19. The fluid connector as recited in claim 18, wherein:
 in a partially engaged state, the second section is spaced apart from the first radially inward facing surface; and
 in a fully engaged state, the second section abuts against the first radially inward facing surface.

20. The fluid connector as recited in claim 16, wherein:
 in a partially engaged state, the second contact element is arranged radially inward from the first radially outward facing surface; and
 in a fully engaged state, the second contact element is aligned with or arranged radially outward from the first radially outward facing surface.

* * * * *